UNITED STATES PATENT [19]

United States Patent [19]

Mickelson

[11] Patent Number: 4,869,055
[45] Date of Patent: Sep. 26, 1989

[54] STAR-SHAPED FLEXIBLE CUTTING LINE

[75] Inventor: Raymond N. Mickelson, Milwaukie, Oreg.

[73] Assignee: Omark Industries, Inc., Portland, Oreg.

[21] Appl. No.: 190,032

[22] Filed: May 4, 1988

Related U.S. Application Data

[63] Continuation of Ser. No. 6,431, Jan. 23, 1987, abandoned.

[51] Int. Cl.⁴ .............................................. A01D 34/63
[52] U.S. Cl. ........................................ 56/12.7; 30/276
[58] Field of Search ........................ 56/12.7; 30/276; 428/397, 400

[56] References Cited

U.S. PATENT DOCUMENTS

| | | | |
|---|---|---|---|
| 2,382,292 | 8/1945 | Carlson | 72/404 |
| 2,434,533 | 1/1948 | Wurzburger | 428/371 |
| 3,104,510 | 9/1963 | Voigt | 56/295 |
| 3,185,613 | 5/1965 | Adams | 428/399 |
| 3,272,901 | 9/1966 | Sims | 264/171 |
| 3,388,198 | 6/1968 | Sims | 264/177 |
| 3,393,083 | 7/1968 | Go | 427/278 |
| 3,402,524 | 9/1968 | Griner | 53/542 |
| 3,474,608 | 10/1969 | Frick | 56/295 |
| 3,567,569 | 8/1966 | Ono | 428/399 |
| 3,671,381 | 6/1972 | Hansen | 428/400 |
| 3,826,068 | 7/1974 | Ballas | 56/12.7 |
| 3,831,278 | 8/1974 | Voglesonger | 30/276 |
| 3,859,776 | 1/1975 | Ballas et al. | 56/12.7 |
| 3,877,146 | 4/1975 | Pittinger | 30/276 |
| 4,047,299 | 9/1977 | Bair | 55/18 |
| 4,054,993 | 10/1977 | Kamp et al. | 56/12.7 |
| 4,107,841 | 8/1978 | Rebhun | 56/12.7 |
| 4,118,865 | 10/1978 | Jacyno et al. | 56/12.7 |
| 4,126,990 | 11/1978 | Fisher et al. | 56/12.7 |
| 4,126,991 | 11/1978 | Gobin et al. | 56/295 |
| 4,186,239 | 1/1980 | Mize | 56/12.7 |
| 4,249,311 | 2/1981 | Inaga | 30/276 |
| 4,310,970 | 1/1982 | Evenson et al. | 30/276 |
| 4,356,686 | 11/1982 | Lessig, III | 56/12.7 |
| 4,584,240 | 4/1986 | Herbert et al. | 428/373 |

FOREIGN PATENT DOCUMENTS 556632 12/1974 Fed. Rep. of Germany.

OTHER PUBLICATIONS

Exhibit A–Photograph of cross–section of "Spintrim" line sold in string trimmer manufactured by Garden Pro, Inc.

*Primary Examiner*—Paul J. Hirsch
*Attorney, Agent, or Firm*—Klarquist, Sparkman, Campbell, Leigh & Whinston

[57] ABSTRACT

A line for a rotating trimmer, the line having a plurality of sharp edges extending longitudinally thereof and spaced circumferentially from each other, with remainder portions, between adjacent edges, depressed, each of the depressions being depressed at least 10 percent of the straight line distance between two adjacent edges on opposite sides thereof. Such line presents only sharpened edges to the material to be cut.

10 Claims, 1 Drawing Sheet

U.S. Patent    Sep. 26, 1989    4,869,055
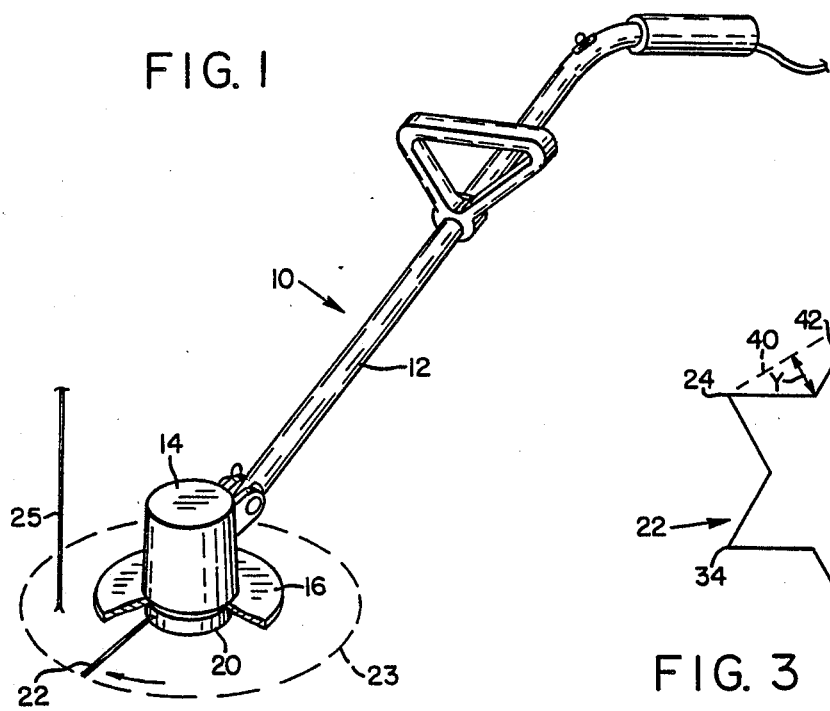
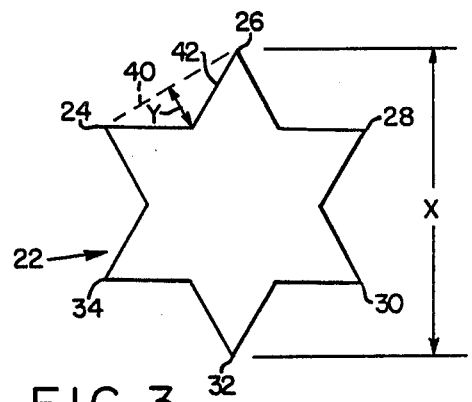
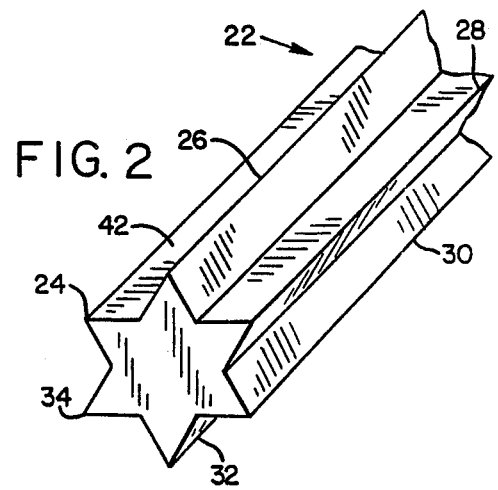
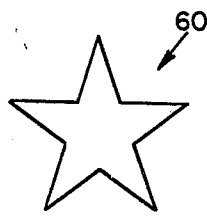
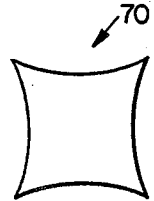
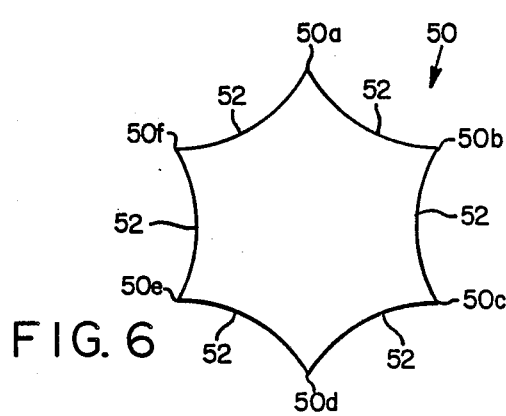

STAR-SHAPED FLEXIBLE CUTTING LINE

This is a continuation of application Ser. No. 07/001 filed Jan. 23, 1987 now abandoned.

BACKGROUND OF THE INVENTION

This invention relates to cutting line for rotating string trimmer devices.

A number of rotating string trimmer devices have been on the market for several years. These generally include a motor driven rotary head from which a length of flexible line extends to cut grass, vines, etc. The section of the line extending outwardly from the rotating head is held substantially straight by centrifugal force. As it is swung in an arc by the rotating head it is able to cut grass, vines, etc.

Such string trimmer line generally has been round in cross-section. Since the line engages the material to be cut with a circular surface it does not provide the most efficient cutting possible.

U.S. Pat. No. 4,186,239 to Mize, et al. illustrates, in one embodiment a somewhat cross-shaped configuration for string trimmer line. However, in Mize the ends of the lobes in the cross-section are rounded, again engaging a workpiece with a circular surface.

U.S. Pat. No. 4,118,865 to Jacyno, et al., illustrates in one embodiment a line with a triangular cross-section. However, the regions between the edges on the line are flat and thus it is possible for a flat section of the line to engage the material to be cut which does not provide the most efficient cutting.

SUMMARY OF THE INVENTION

An object of the present invention is to provide a novel line for a rotating string trimmer, which line has elongate sharp edges separated by depressed regions each being depressed at least 10 percent of the distance between the two adjacent edges on opposite sides thereof to permit the sharpened edges to remain at the outer-most portion of the line and thus always be Regardless of the orientation of the line upon striking the work-piece a sharpened edge will engage it first.

A general object therefore is to provide a novel string trimmer line which is inexpensively produced and provides improved cutting characteristics.

Yet another object of the present invention is to provide a novel string trimmer line which not only has the capability of producing improved cutting, but also is adapted to be wound on a spool for convenient storage and mounting on the head of a string trimmer device.

A further object of the present invention is to provide a novel string trimmer line with sharp edges extending longitudinally therealong for making cleaner cuts through work pieces, and also providing, through this improved cutting, a line which takes less effort to operate and thus does not place as great a load on the motor of the trimmer device as has prior string trimmer line.

An added feature and advantage of this invention is that by providing sharper cutting edges, cleaner cuts are provided. This is a benefit when grass is being cut since there will be fewer ragged grass ends which tend to turn brown after cutting. Ragged edges provide points of entry for disease.

These and other objects and advantages will become more apparent as the following description is read in conjunction with the drawings.

BRIEF DESCRIPTION OF THE DRAWINGS

FIG. 1 illustrates a form of string trimmer device on which line according to the present invention may be used;

FIG. 2 is an enlarged perspective end view of a section of line according to one embodiment of the present invention;

FIG. 3 is a further enlarged end view of the line shown in FIG. 2; and

FIGS. 4, 5 and 6 are enlarged end view illustrations of modified embodiments of the invention.

DESCRIPTION OF PREFERRED EMBODIMENT OF THE INVENTION

At 10 in FIG. 1 is illustrated a known string trimming device. It includes an elongate handle 12, and a motor 14 mounted adjacent the lower end of the handle. A circular protective shroud 16 is secured to the underside of motor 14. A portion of shroud 16 has been broken away.

Under shroud 16, and mounted to the depending rotary shaft of motor 14 is a spool hub, or head, 20. The hub carries a length of flexible string trimmer line, a portion of which is illustrated at 22 projecting outwardly from hub 20.

As motor 14 is operated, hub 20 rotates at great speed. The outwardly projecting section of line 22 is swung in a circle indicated by dashed line 23, whereby it will contact and cut off grass 25 or other material in its path.

Referring now to FIGS. 2 and 3, enlarged sections of line 22 are illustrated in greater detail. The line comprises an elongate element formed of a flexible plastic material which has a plurality of elongate substantially sharp edges 24, 26, 28, 30, 32 and 34 extending longitudinally therealong. As is seen in the illustrations these sharp edges are substantially equally spaced-apart circumferentially about the periphery of the element. All of the edges substantially equidistant from the center of the like.

In FIG. 3 an imaginary straight line 40 has been drawn between edges, or tips, 24, 26. The surface regions 42 of the line between adjacent edges 24, 26 are formed in a V-shape depression lying inwardly from line 40. Such depressed regions are found between each of the adjacent sets of edges, or tips, about the periphery of the element. Each of the depressions are depressed a distance Y from the straight line distance 40 between two adjacent edges which is at least 10 percent of such straight line distance. Thus, in FIG. 3, the depressions are each depressed approximately 29 percent.

By having the sharpened edges spaced circumferentially about the periphery of the element and regions intermediate the edges depressed, when the line is in operation there is no way that any portion of the line element other than a sharpened edge can initially contact a work piece to be cut.

Referring still to FIG. 3, an example series of dimensions for the line will be described. The maximum side-to-side dimension "X" of the line for normal string trimmers may be in a range of 0.040 to 0.155 inch. With the configuration illustrated in FIG. 3 depression "Y" would be in a range of 0.003 to 0.022 inch. The line of the invention also may be used for other rotating cutters, such as lawn mowers, which could have a dimension "X" in excess of 0.155 inch.

Since such line frequently may be wound on a spool for use in a string trimmer, it is preferable for the line to be made of a plastic with a flexural modulus in a range of 35,000 to 400,000 psi. This, in conjunction with the example dimensions noted above for trimmer line, may allow it to be wound on spools, or hubs, having a diameter down to 1.5 inches.

Referring to FIG. 6, an end view of another six-edged line 50 is illustrated. Although it has six substantially sharp edges 50a, 50b, 50c, 50d, 50e, 50f, as in the FIGS. 2 and 3 embodiment, here the depressed regions between adjacent edges do not take a shallow V-shaped configuration as in the prior embodiment. Here the depressional substantially rounded, or concave, as indicated in and are each depressed approximately 16 percent of the straight line distance between two adjacent edges.

Referring to FIG. 4, a 5-pointed, generally star-shaped line cross-section is illustrated as a further embodiment of line 60.

FIG. 5 illustrates an additional embodiment of line 70 which has four elongate substantially sharp edges with rounded concavities between intermediate edges which are each depressed approximately 11 percent of the straight line distance between two adjacent edges.

In use, the elongate line mounted on rotating hub 20 is spun in a circular arc as illustrated in FIG. 1. As it engages a workpiece, such as grass 30, a sharpened edge of the line will always be the first part of the line to contact the workpiece. This is a function of the number of sharp edges arrayed about the periphery of the line and the depressions, or concavities, between adjacent sharpened edges which are each depressed a distance of at least 10 percent of the straight line distance between the two adjacent edges on opposite sides of such depression. With a sharp edge always being the first part of the line to contact a workpiece efficient and effective cutting will occur.

While preferred embodiments of the invention have been illustrated and described herein, it should be apparent to those skilled in the art that modifications and revisions may be made while still being encompassed by the following claims.

I claim:

1. A line for a rotating string trimmer, said line comprising an elongate flexible cutting element having at least four substantially continuous sharp elongated edges extending longitudinally thereof and spaced circumferentially from each other with remainder portions of said element between adjacent edges being depressed and positioned inwardly from a straight line extending from the tip of one sharp edge to the tip of an adjacent edge a distance of at least 10 percent of the length of said straight line so that at least one of said sharp edges first contacts the material being cut regardless of the orientation of the cutting element.

2. In a rotating string trimmer, a head for retaining a supply of trimmer line, means for driving said head, and trimmer line mounted on said head, said line comprising an elongate flexible cutting element having at least four substantially continuous sharp edges extending longitudinally thereof and spaced circumferentially and equidistant from each other about the element, said all being substantially equidistant from the center of the line with remainder portions of said element between adjacent edges being depressed with their innermost surfaces positioned inwardly from a straight line extending from the tip of one sharp edge to the tip of an adjacent sharp edge a distance of at least 10 percent of the length of said straight line so that at least one of the sharp edges first contacts the material being cut, regardless of the orientation of the cutting element.

3. A line for a rotating string trimmer adapted to cut vegetation material such as grass and the like, said line comprising an elongate flexible plastic cutting element of substantially uniform cross-section along its length having at least four substantially continuous sharp edges extending longitudinally thereof and spaced circumferentially from each other about the element, and the remainder surface portions of said element between adjacent edges each being depressed with their innermost surfaces positioned inwardly from a straight line extending from the tip of one sharp edge to the tip of an adjacent sharp edge a distance of at least 10 percent of the length of said straight line, said sharp edges and depressed surface portions being positioned on said elements so that one of the sharp edges first contacts the material being cut, regardless of the rotational orientation of the element with respect to such material, and said trimmer line being sufficiently flexible to coil about a spool and to uncoil from the spool to feed said cutting element outward from said spool so that the orientation of the cutting element changes as it is fed from the spool.

4. The line of claim 3, wherein said region between adjacent edges is substantially concave.

5. The line of claim 3, which has a side-to-side outer dimension in a range of from 0.040 to 0.155 inch.

6. The line of claim 3, which has a flexural modulus in a range of from 35,000 psi to 400,000 psi.

7. The line of claim 3, which comprises fine sharp edges.

8. The line of claim 3, which comprises a minimum of four sharp edges and a maximum of ten sharp edges.

9. The line of claim 3, wherein said edges are substantially equally spaced about said element.

10. The line of claim 3, wherein said element has sufficient flexibility that it is capable of being wound on and will generally remain in a wound position on a spool with a minimum diameter of 1.5 inches.

* * * * *

UNITED STATES PATENT AND TRADEMARK OFFICE
CERTIFICATE OF CORRECTION

PATENT NO. : 4,869,055

DATED : September 26, 1989

INVENTOR(S) : Raymond N. Mickelson

It is certified that error appears in the above-identified patent and that said Letters Patent is hereby corrected as shown below:

Column 1, line 42, insert "the first portion of the line to engage a member to be cut." between the words "be" and "Regardless".

Column 2, line 53, "29" should be --28--.

Column 4, line 9, insert "edges" between the words "said" and "all".

Column 4, line 47, "fine" should be --four--.

Signed and Sealed this

Second Day of April, 1991

Attest:

HARRY F. MANBECK, JR.

*Attesting Officer*  *Commissioner of Patents and Trademarks*